(12) United States Patent
Cooper

(10) Patent No.: US 10,275,347 B2
(45) Date of Patent: Apr. 30, 2019

(54) SYSTEM, METHOD AND COMPUTER PROGRAM PRODUCT FOR MANAGING CACHES

(75) Inventor: Brian Frank Cooper, San Jose, CA (US)

(73) Assignee: Excalibur IP, LLC, New York, NY (US)

( * ) Notice: Subject to any disclaimer, the term of this patent is extended or adjusted under 35 U.S.C. 154(b) by 754 days.

(21) Appl. No.: 12/719,510

(22) Filed: Mar. 8, 2010

(65) Prior Publication Data

US 2011/0218971 A1    Sep. 8, 2011

(51) Int. Cl.
G06F 12/00    (2006.01)
G06F 12/08    (2016.01)
G06F 16/00    (2019.01)

(52) U.S. Cl.
CPC .............. *G06F 12/00* (2013.01); *G06F 12/08* (2013.01); *G06F 16/00* (2019.01)

(58) Field of Classification Search
CPC ..................................................... G06F 12/00
USPC .................................. 707/689, 690; 711/118
See application file for complete search history.

(56) References Cited

U.S. PATENT DOCUMENTS

| | | | | |
|---|---|---|---|---|
| 5,369,757 A | * | 11/1994 | Spiro et al. ..................... | 714/19 |
| 5,956,489 A | * | 9/1999 | San Andres et al. ......... | 709/221 |
| 6,493,726 B1 | * | 12/2002 | Ganesh et al. | |
| 2002/0133491 A1 | * | 9/2002 | Sim et al. ....................... | 707/10 |
| 2004/0148289 A1 | * | 7/2004 | Bamford et al. ............... | 707/10 |
| 2004/0230903 A1 | * | 11/2004 | Elza et al. ..................... | 715/513 |
| 2005/0210073 A1 | * | 9/2005 | Oeda et al. ................... | 707/200 |
| 2007/0162462 A1 | * | 7/2007 | Zhang et al. .................. | 707/10 |
| 2009/0106758 A1 | * | 4/2009 | Giampaolo ................... | 718/101 |

* cited by examiner

*Primary Examiner* — Syling Yen
(74) *Attorney, Agent, or Firm* — Berkeley Law & Technology Group, LLP

(57) ABSTRACT

Methods, systems and computer program products are provided for managing at least one cache for a database. In one method, an operation record is inserted in an operations log for each write operation to the database. The operation record includes a Log Sequence Number (LSN). At least one cache is updated using operation records in the operations log. To update a cache, unapplied operations in the operations log for the cache are identified using an applied LSN associated with the cache. The applied LSN denotes an LSN of a last operation applied to the cache. The unapplied operations are then applied to the cache and the applied LSN is updated with an LSN corresponding to the last unapplied operation of the unapplied operations that were applied to the cache during updating the cache.

27 Claims, 14 Drawing Sheets

| LSN | Key | Action Type | Generation |
|---|---|---|---|
| 1 | Brian | Drop | 1 |
| 2 | Sara | Drop | 1 |
| 3 | Joe | Drop | 1 |
| 4 | Bob | Drop | 2 |
| 5 | Bill | Drop | 1 |

SYSTEM, METHOD AND COMPUTER PROGRAM PRODUCT FOR MANAGING CACHES

TECHNICAL FIELD

The present disclosure relates to systems, methods and computer program products for managing at least one cache for a database.

BACKGROUND

With increased penetration of the Internet and higher data access speeds, a variety of cloud applications/services are being offered and are becoming increasingly popular. Example such applications/services include, but are not limited to, web-based e-mails, social networking sites, news/financial portals, content sharing sites, cluster computing, payment gateways etc. Given the explosion in Internet users, these applications/services require huge data storage capacity for storing large amount of the customers' data, information associated with the customers (for example, customer logins, authentication information, customer preferences, customer created content, etc.) as well as metadata for cluster management or database catalog information. Scalable distributed database systems, such as, Yahoo! Sherpa, Amazon Dynamo, Google BigTable and the like, offer the massive storage space and processing power to facilitate the cloud applications/services.

To improve performance of the distributed database systems and to support the customers' spread over large geographical area, external caches are deployed. The caches store a local copy of data items that are frequently accessed by customers serviced by the caches, thereby decreasing query processing time and reducing latency and network traffic for accessing the data items from the underlying database.

It is very important to maintain consistency between the external caches as well as the underlying database to ensure proper operation of the applications/services and prevent loss of customer satisfaction. This is especially critical if different cache servers store different versions of system metadata, for example, metadata representing storage mapping. In this case, an application accessing an older version of the storage mapping may expose bad data and may lead to unexpected behavior of the application.

However, maintaining cache consistency is a big challenge. To ensure cache consistency, stale copies of the data stored in multiple cache servers need to be invalidated. One common technique uses trigger capability provided by many currently available database systems, such as, Structured Query Language (SQL) databases to invalidate stale data items. According to this technique, whenever a data item changes in the underlying database, the database sends a trigger to all caches notifying the caches of the change in the data item. The caches then invalidate respective local copies of the changed data item. However, not all database systems support such a trigger mechanism. According to another technique, each write operation on a data item is routed through only one cache that holds a copy of that data item. Therefore, any modification to the data item is known by the cache and the cache can invalidate the local copy of the data item. However, since all access operations for the data item pass through the single cache, this solution is not very scalable and may also increase access latency.

SUMMARY

Methods, systems and computer program products are provided for managing at least one cache for a database. In one method, an operation record is inserted in an operations log for each write operation to the database. The operation record includes a Log Sequence Number (LSN). At least one cache is updated using operation records in the operations log. To update a cache, unapplied operations in the operations log for the cache are identified using an applied LSN associated with the cache. The applied LSN denotes an LSN of a last operation applied to the cache. The unapplied operations are then applied to the cache and the applied LSN is updated with an LSN corresponding to the last unapplied operation.

BRIEF DESCRIPTION OF DRAWINGS

FIG. 3 is an example operations log, according to one embodiment of the present invention.

DETAILED DESCRIPTION

Various embodiments of the present invention will be described in detail below with reference to accompanying drawings. It will be apparent, however, that these embodiments may be practiced without some or all of these specific details. In other instances, well known process steps or elements have not been described in detail in order not to unnecessarily obscure the description of the invention. The following example embodiments and their aspects are described and illustrated in conjunction with apparatuses, methods, and systems which are meant to be illustrative examples, not limiting in scope.

Particular embodiments of the present invention provide methods, systems and computer program products for managing at least one cache for a database. In one embodiment, an operation record is inserted into an operations log for each write operation to the database for a data item. Each operation record includes a Log Sequence Number (LSN) identifying the operation record. Thus, the operations log lists all modifications to the database with one operation record corresponding to one write operation on a data item in the database and therefore, each cache may need to be updated to keep the cache up to date with other caches and the database. In various embodiments, unapplied operations are identified for each cache using an applied LSN associated with the cache. The applied LSN denotes the last operation applied to the cache. Further, the unapplied operations are applied to the cache and the applied LSN is updated accordingly. In further embodiments, a lease may be obtained on the applied LSN for a predetermined lease interval. A valid lease may indicate that the cache is active and data items stored in the cache are valid, according to one embodiment. On the other hand, an invalid lease may indicate that the cache is stale. In an embodiment, the lease is renewed at a lease renewal time for the cache and the cache may be updated at or before the lease renewal time.

Figure 1:
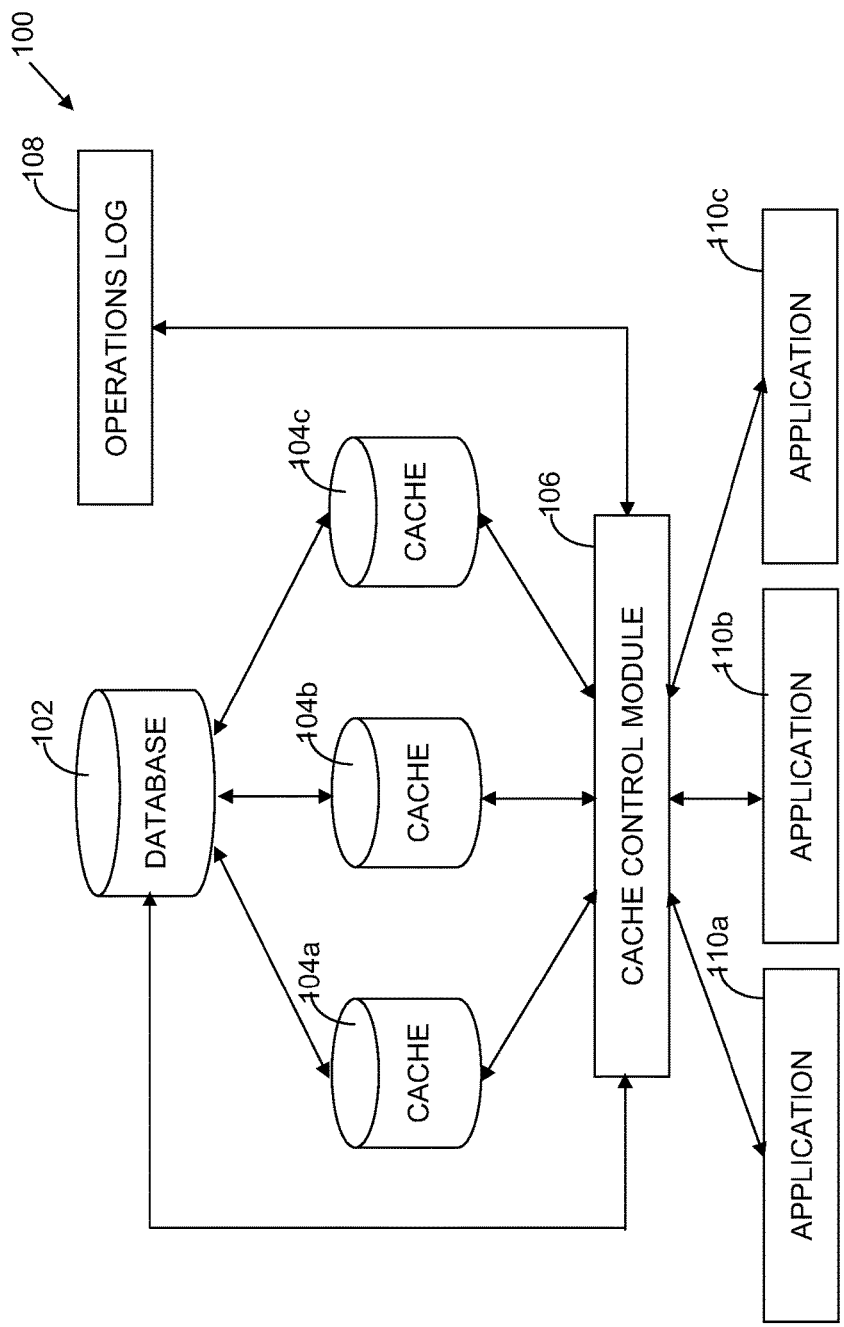
FIG. 1 is an example implementation of a system for managing at least one cache for a database, according to one embodiment of the present invention.

FIG. 1 is an example implementation of a system 100 for managing at least one cache for a database, in accordance with one embodiment of the present invention. System 100 includes a database 102, at least one cache, for example, 104a, 104b and 104c, a cache control module 106, and an operations log 108. System 100 may further include one or more applications 110a, 110b and 110c to provide various services to a plurality of customers.

Database 102 is a persistent data store for storing one or more data items that may be used by the plurality of customers. Database 102 may be implemented using any known database solutions such as, but without limitation, a Relational Database Management System (RDBMS), an Extensible Markup Language (XML) database, a flat file database, an object oriented database, a Resource Description Framework store, a Distributed Hash Table and the like. In an embodiment, database 102 may present only a hash table or other key-value map to any external system elements irrespective of internal implementation of database 102. Depending on the type of database model adopted, the one or more data items in database 102 may be accessed by making use of a suitable query language, such as, but not limited to, Structured Query Language, Object Query Language and the like.

The data may be stored in any format known in the art, for example, objects, flat files, tables, hash tables and the like. Individual data items may be an atomic entry, a data structure, a tuple and the like. In one embodiment, the one or more data items may be uniquely identified by a key. Database 102 may store various types of data including, but not limited to, the customers' data (for example, e-mails, files, multimedia content etc.), information associated with the customers (for example, customer logins, authentication information, personal information, customer preferences etc.), content (for example, documents, video, images etc.) shared by multiple customers, various types of information accessed by the customers (for example, news, financial information etc.) as well as system metadata (for example, cluster mapping, database catalog information etc.) and the like. Database 102 may be located at a single location or may be distributed across multiple geographical locations.

At least one cache 104a-104c is coupled to database 102. At least one cache 104a-104c may store local copies of the one or more data items for enabling the customers faster query processing and reduced access latency to the one or more data items. At least one cache 104a-104c may typically be deployed across different geographical locations, for example, at least one cache 104a-104c may reside in different cities, different states or different countries. Depending upon requirements, at least one cache 104a-104c may be a database cache, a proxy cache, a web cache and the like and may be implemented using any known techniques in the art.

Cache control module 106 manages at least one cache 104a-104c, in accordance with one embodiment of the present invention. Cache control module 106 may reside at any of at least one cache 104a-104c, for example, at cache 104a, according to one embodiment. Cache control module 106 may then control other caches, namely, 104b and 104c, remotely. In another embodiment, cache control module 106 may be implemented in a distributed manner residing at each cache of at least one cache 104a-104c.

One or more applications 110a-110c provide various services to the customers. The services include, but are not limited to, web-based e-mails, social networking sites, news/financial portals, content sharing sites, cluster computing, payment gateways and the like. Applications 110a-110c may be web-based services or may be implemented as stand-alone applications that reside on client devices and access the data from database 102 over a network.

Applications 110a-110c execute associated application logics to provide the services. During the execution of the application logic, an application, for example, application 110a, may generate requests to read a data item stored in database 102 or to modify a data item stored in database 102. In one embodiment, the read and write requests are sent to cache control module 106. According to another embodiment, application 110a may issue the requests to a cache, for example, cache 104a, and cache 104a may forward the requests to cache control logic 106. To ensure consistency between caches 104a-104c and database 102, all modifications to data items in database 102 performed by write operations may need to be reflected across all caches 104a-104c.

According to one embodiment, cache control module 106 maintains consistency between at least one cache 104a-104c and database 102 using operations log 108. Operations log 108 includes a plurality of operation records. Each operation record corresponds to a write operation on a data item stored in database 102. The operation record includes a Log Sequence Number (LSN) identifying the operation record. In one embodiment, the LSN is an integer and consecutive operation records have consecutive integers as LSN. In another embodiment, successive unique members from a series of random numbers may be assigned as LSN. Any other suitably increasing numeric, alphabetic or alphanumeric values may also be assigned as LSNs without deviating from the spirit and scope of the present invention.

The operation record further includes a key to the data item, according to one embodiment. The key may be alphabetic (for example, name of the data item), numeric or alphanumeric. In one embodiment, the operation record may also include a modified value of the data item. The operation records may also include a generation associated with the data item. The generation may denote a version of the data item with a higher generation for the data item representing a more recent change to the data item. According to one embodiment, the generation may be denoted by a numerical value such that the numerical value may be suitably increased with each modification to the data item. In one embodiment, the generation may also be stored in database 102 along with the corresponding data item. In various embodiments, the operation record may further include an action to be performed on a copy of the data item maintained in at least one cache 104a-104c to make the cache up to date. The action may be one of "drop", "redo", "repair" and the like.

In one embodiment, operations log 108 may be stored as records in an ordered data store. In another embodiment, operations log 108 may be stored as elements in a hash table. Any other suitable format may also be used for storing operations log 108 without deviating from the spirit and scope of the present invention.

In one embodiment, cache control module 106 inserts an operation record in operations log 108 for each write operation to database 102. In another embodiment, applications 110a-110c, instead of or in addition to cache control module 106, may also insert operation records in operations log 108 for each write operation to database 102. The operation record is added after the most recent operation record. LSN of the most recent operation record in operations log 108 is hereinafter referred to as a last LSN. In an embodiment, the last LSN is memoized in a memoized LSN record in operations log 108 to facilitate easy determination of the last LSN in operations log 108. Operations log 108 may thus represent all modifications performed on data items stored in database 102. Further, once a new operation record is added to operations log 108 for a data item, local copies of the modified data item stored in any of at least one cache 104a-104c may become stale. Therefore, to maintain consistency, each cache of at least one cache 104a-104c may need to invalidate local copies of the modified data items. In one embodiment, cache control module 106 updates each cache using an applied LSN associated with the cache. The applied LSN identifies the last operation applied to the cache at a given time. In one embodiment, cache control module 106 periodically scans operations log 108 and applies operations corresponding to operation records having LSN between (applied LSN+1) and the last LSN.

In additional embodiments, cache control module 106 may also take a lease on the applied LSN for each cache from operations log 108 for a lease interval. In one embodiment, the lease interval is a design parameter and may be negotiated between at least one cache 104a-104c and operations log 108. The lease interval may be the same for all caches or may be different for each cache. In an example implementation, the lease interval is set to one minute. In one embodiment, a cache is considered up to date as long as the lease on the applied LSN for the cache is valid. Cache control module 106 stores a lease renewal time for each cache, according to one embodiment. Further, cache control module 106 renews the lease for each cache on or before the lease expiration, that is, on or before the lease renewal time by issuing a lease renewal request to operations log 108. According to one embodiment, cache control module 106 updates each cache upon issuing the respective lease renewal request. Various embodiments of implementing cache control module 106 are described in detail in conjunction with FIG. 2.

Further, in additional embodiments, system 100 may also maintain strict consistency between at least one cache 104a-104c and database 102. In one embodiment, the strict consistency is maintained by ensuring that a new version of a data item is not visible to any cache unless all older versions of the data item are purged from all caches. In one example implementation, once a data item is modified and corresponding operation record is added in operations log 108, new value of the modified data item is made available to applications 110a-100c only after a predefined time, for example, after (N*lease interval), where N is a real multiplier. N may be selected according to design and performance consideration. In an example implementation, N is set to 2. In another example implementation, if the lease interval is different for different caches, the new value may be made available only after (N*maximum lease interval), where maximum lease interval denotes the maximum of different lease interval values.

Various scenarios for deploying various elements of system 100 are possible within the scope of the present invention. For example, in one deployment scenario, a first service provider may integrate at least one cache 104a-104c and cache control module 106 and deploy it as a cache management platform. The first service provider may use any database 102 supplied by a database service provider. Further, the first service provider may present an Application Programming Interface (API) to one or more application providers implementing applications 110a-110c. In one embodiment, the API may be presented as dynamic library file (for example, .DLL files for Windows, or .SO files for UNIX). In another embodiment, the API may be provided as a web service and applications 110a-110c may then perform REST calls to access the web service.

In another example deployment scenario, the database service provider deploys database 102 and a second service provider may deploy at least one cache 104a-104c, cache control module 106 and an application, for example, application 110a. In yet another deployment scenario, the database service provider provides database 102, a cache service provider (for example, Cloudera) deploys at least one cache 104a-104c and a third service provider may deploy cache control module 106 integrated with an application, for example, application 110b.

Figure 2:
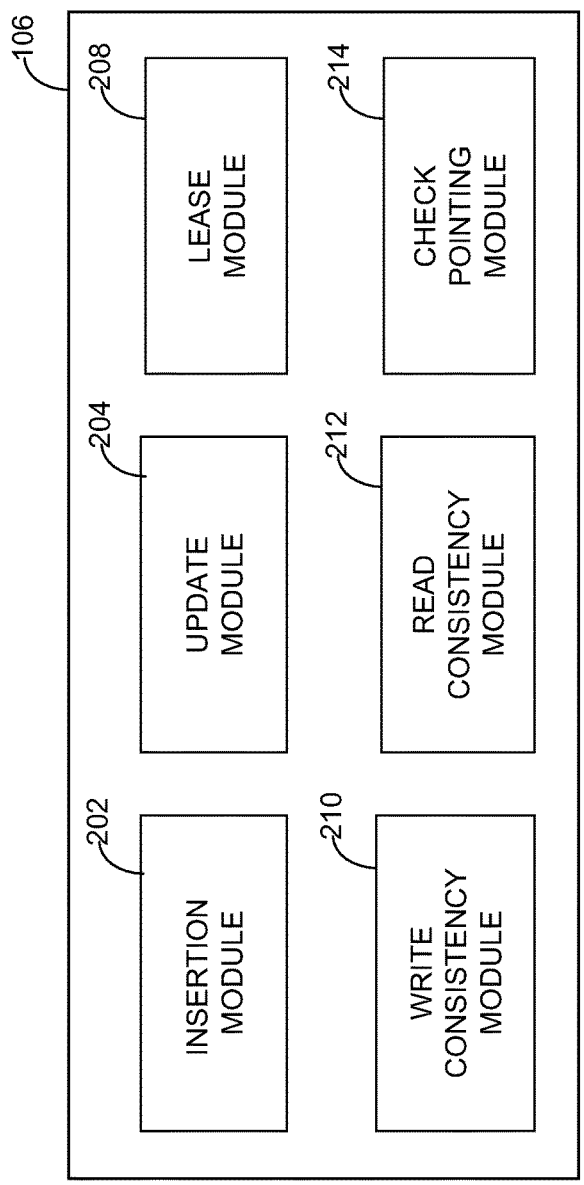
FIG. 2 is a simplified block diagram of a cache control module, according to one embodiment of the present invention.

FIG. 2 is a simplified block diagram of cache control module 106, in accordance with one embodiment of the present invention. Cache control module 106 includes an insertion module 202, and an update module 204. Cache control module 106 may further include a lease module 206. Cache control module 106 may further include a write consistency module 208 and a read consistency module 210, according to one embodiment. Cache control module 106 may further comprise a check pointing module 212. Though various embodiments for implementing cache control module 106 are described here with respect to cache 104a only, the description is equally applicable to caches 104b and 104c without deviating from the spirit and scope of the invention.

Upon receiving a request from an application, say, application 110a for performing a write operation on a data item, insertion module 202 inserts a new operation record in operations log 108 for the data item, in accordance with one embodiment of the present invention. Insertion module 202 finds a last LSN denoting LSN of the most recent operation record in operations log 108. Insertion module 202 finds the most recent operation record in operations log 108, by scanning operations log 108 till end of operations log 108 is reached, according to one embodiment of the present invention. An operation record at the end of operations log 108 is the most recent operation record and its LSN represents the last LSN. In one embodiment, insertion module 202 may access the memoized LSN record, according to one embodiment of the present invention and then scan operations log 108 starting at the memoized LSN. According to another embodiment, insertion module 202 may scan operations log 108 starting at the applied LSN of cache 104a. According to yet another embodiment, insertion module 202 may also scan operations log 108 from beginning of operations log 108.

Once insertion module 202 finds the last LSN, insertion module assigns a next LSN (that is, last LSN+1) to the new operation record. A person skilled in the art will appreciate that the (last LSN+1) simply denotes the next LSN to the last LSN and actual value of (last LSN+1) depends upon the scheme used for assigning the LSNs. Insertion module 202 then adds the new operation record in operations log 108 at (last LSN+1). According to one embodiment, insertion module 202 may use a Test-and-Set process for adding the new operation record. Accordingly, insertion module 202 attempts to add the new record at (last LSN+1) and checks whether the add operation is successful. If the add operation fails, insertion module 202 attempts to add the new record at a next higher LSN (that is, last LSN+2). Insertion module 202 repeats this process till the add operation is successful. When the add operation is successful, insertion module 202 may then save the LSN for which the add operation was successful into the memorized LSN record. The Test-and-Set process helps in avoiding conflicts when more than one cache control modules 106 are trying to insert an operation record into operations log 108 simultaneously.

As mentioned earlier, all operations in operations log 108 may need to be applied to each of at least one cache 104 to ensure consistency across at least one cache 104. According to one embodiment of the present invention, update module 204 identifies unapplied operations in operations log 108 for cache 104a. In one embodiment, update module 204 uses the applied LSN associated with the cache 104a to identify the unapplied operations for cache 104a. To identify the unapplied operations, update module 204 may first check whether any unapplied operations are present in operations log 108 by comparing the applied LSN with the last LSN, according to one embodiment. When the applied LSN is less than the last LSN, update module 204 may infer that unapplied operations for cache 104a are present. Further, update module 204 identifies operations corresponding to operation records with LSN greater than the applied LSN as the unapplied operations for cache 104a. On the other hand, when the applied LSN is equal to the last LSN, update module 204 may infer that no unapplied operations are present and cache 104a is up to date.

Once the unapplied operations are identified for cache 104a, update module 204 may access operation records having LSN greater than the applied LSN (from applied LSN+1 to the last LSN) for cache 104a. For each operation record, update module 204 checks whether a data item corresponding to the operation record is stored in cache 104a. When the data item is present in the cache 104a, update module 204 performs an action corresponding to the operation record on the data item. In accordance with one embodiment, update module 204 may also compare the generation of the data item in the operation record with the generation of the data item in cache 104a. In this case, update module 204 may perform the action only when the generation of the data item in the operation record is more than the generation value of the data item in cache 104a. Otherwise, update module 204 may ignore the operation record.

In one embodiment, the operation record may perform an action specified in the operation record. Alternatively, update module 204 may perform a default action, for example, "Drop", for all operation records. In this case, update module 204 drops respective data items for all unapplied operations. Further, update module 204 ignores the operation record when the corresponding data item is not stored in cache 104a and proceeds with a next unapplied operation. Update module 204 repeats this process for all operation records starting at (applied LSN+1) till the last operation record of operations log 108 is reached, thereby indicating that update module 204 has applied all unapplied operations to cache 104a. An example case of applying the unapplied operations is explained in conjunction with FIGS. 3-7. Once update module 204 applies all unapplied operations, update module 204 replaced old value of the applied LSN with the last LSN.

In various embodiments, lease module 206 may take a lease on the applied LSN associated with cache 104a for duration equal to the lease interval. In an example implementation, the lease interval is set to one minute, though any other suitable value may also be used. The lease may need to be periodically renewed before the lease expiration time to keep cache 104a up to date. In one embodiment, lease module 206 issues a lease renewal request for cache 104a to operations log 108 on or before the lease expiration time for cache 104a. In an example implementation, the lease renewal request may be issued as a REST call to operations log 108. Further, a cron job may be developed to issue the lease renewal requests on or before the lease renewal time. According to one embodiment, lease module 206 may also trigger update module 204 to update cache 104a along with issuing the lease renewal request. Lease module 206 may renew the lease on the applied LSN once update module 204 applies all operations in operations log 108 to cache 104a. Lease module 206 may also update the lease renewal time by the lease interval. This indicates that cache 104a is up to date till the lease renewal time.

As operations log 108 may grow large over time, operation records may need to be deleted periodically from operations log 108. Check pointing module 212 periodically deletes operation records from operations log 108. In one embodiment of the present invention, check pointing module 212 may delete operation records that are older than a predefined time and also have LSN less than the memoized LSN. In an example implementation, the predefined time is set to be a multiplier of the lease interval, for example, (2*lease interval). Any other suitable time duration may also be used without deviating from the spirit and scope of the present invention.

In one embodiment of the present invention, cache control module 106 also maintains strict consistency across caches 104a-104c and database 102 as mentioned earlier. According to one embodiment, write consistency module 208 may ensure strict consistency during write operations, whereas read consistency module 210 may ensure strict consistency during read operations. Write consistency module 208 receives a request for performing a write operation on a data item stored in database 102 from any of applications 110a-110c, for example, from application 110a. Upon receiving the request, write consistency module 208 may first trigger insertion module 202 for inserting a new operation record corresponding to the received write operation in operations log 108 as explained earlier. Upon successful insertion of the new operation record, write consistency module 208 may check whether an active latch is present on the data item in database 102, in accordance with one embodiment of the present invention. When an inactive or no latch is present on the data item, write consistency module 208 modifies the data item in database 102. Write consistency module 208 may further add a latch on the modified data item. In one embodiment, write consistency module 208 may also set a latch expiration time for the latch, if database 102 supports latch expiration mechanism known in the art. In an example implementation, the latch expiration time is set to (N*lease interval), where N denotes an integer multiplier, though any other value may also be used depending upon the design. The latch expires after the latch expiration time and database 102 may delete the latch. Alternatively, write consistency module 208 may add a timestamp along with the latch, for example, "this latch was added at 3 PM". This is useful when database 102 does not support the latch expiration mechanism. Write consistency module 208 may use a system time provided by database 102 for the timestamp. In such implementation, write consistency module 208 may determine whether the latch is active by checking if the system time has advanced by more than a predefined duration, for example, (N*lease interval) from the timestamp of the latch. A positive result of this check indicates that the latch is inactive; write consistency module 208 may then delete the current latch and add a new latch after writing the data item to database 102.

Upon detecting that the active latch is present on the data item, write consistency module 208 may send a failure message to application 110a, according to one embodiment. Application 110a may then issue the request again after a predefined time. In another embodiment, write consistency module 208 may delay the write operation until the latch expires and then complete the write operation. In yet another embodiment, write consistency module 208 may complete the write operation, renew the latch and update the latch expiration time as described earlier.

Similarly, read consistency module 210 may receive a request for a read operation on a data item stored in database 102 from any of applications 110a-110c, for example, from application 110a, according to one embodiment. Read consistency module 210 may check whether an active latch is present on the data item in database 102. In an embodiment, when the latch includes a timestamp, read consistency module 210 may determine whether the system time has advanced by more than a predefined duration, for example, (N*lease time) from the timestamp of the latch. If the system time has not advanced beyond the predefined time, read consistency module 210 infers that the latch is active. When the latch is active, read consistency module 210 may send a failure message to application 110a, according to one embodiment. Application 110a may then reissue the request after a predefined time. In one embodiment, the data item having the active latch may not be cached in cache 104a. Alternatively, the data item may be cached in cache 104a along with the latch and corresponding latch expiration time. In this case, read consistency module 210 may check for the active latch in the cached data item upon subsequent read requests for the data item. In addition, read consistency module 210 may delete the latch on the cached data item after the latch expiration time.

In an embodiment, when read consistency module 210 encounters an inactive or no latch, read consistency module 210 may behave in a usual manner, that is, read consistency module 210 may pass the data item to application 110a and cache the data item in cache 104a. Further, read consistency module 210 may delete the inactive latch on the data item in database 102.

FIG. 3 illustrates an example operations log 108, according to one embodiment of the present invention. As shown in the example, operations log 108 includes five operation records, with keys Brian, Sara, Joe, Bob and Bill. These operation records are assigned LSN from 1 to 5, respectively. Thus, LSN of the most recent operation record equals 5, that is, last LSN=5. Additionally, in the example shown, the action type for all the operation records is set to "Drop". As mentioned earlier, any other action type may also be assigned for all or different operation records. Further, the operation records also include generation field, for example, the data item with the key "Bob", the generation number is 2, whereas for all other operation records, generation number is 1. A person skilled in the art will appreciate that the operation records may also include additional fields without deviating from the spirit and scope of the present invention.

Figure 4:
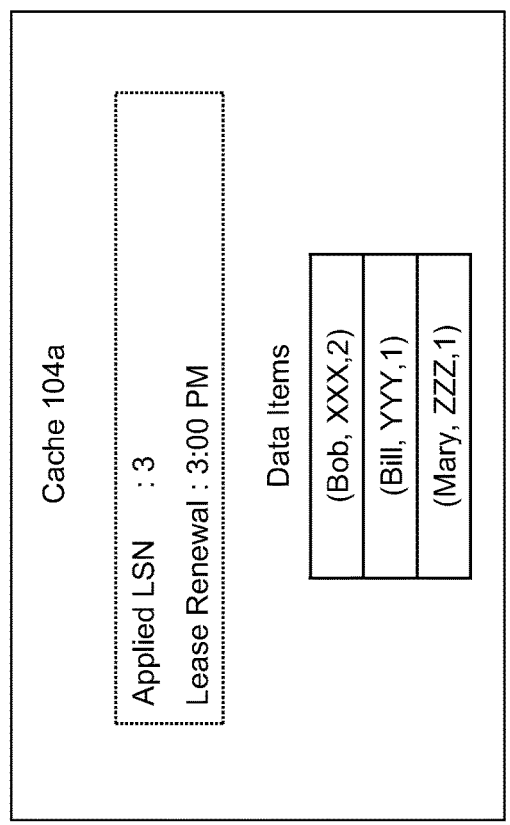
FIG. 4 is an example state of a cache before renewing a lease, according to one embodiments of the present invention.

FIG. 4 illustrates an example state of cache 104a before lease renewal time for cache 104a, according to one embodiment of the present invention. As shown, the lease renewal time for cache 104a is 3 PM and the applied LSN is equal to 3, that is, cache 104a has applied all operations having LSN less than or equal to 3. Further, cache 104a includes three cached data items. In the example shown, each cached data item includes three fields, namely, key, value and generation. Accordingly, the first cached data item has the key as Bob, the value as XXX and the generation as 2. The second cached data item has the key as Bill, the value as YYY and the generation as 1, whereas the third cached data item has the key as Mary, the value as ZZZ and the generation as 1.

Figure 5:
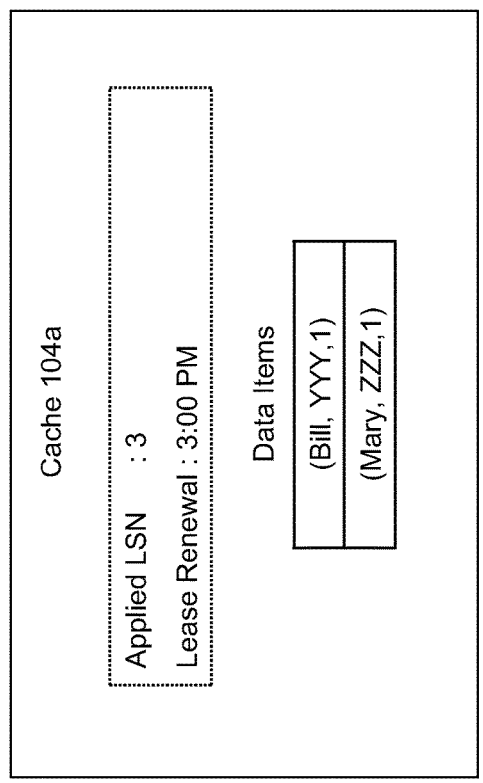
FIG. 5 is an example state of the cache state after applying a first unapplied operation, according to one embodiment of the present invention.

As explained earlier, at the lease expiration time, lease module 206 triggers update module 204. Update module 204 compares the applied LSN with the last LSN. In the example shown, update module 204 finds that the last LSN (equal to 5) is greater than the applied LSN (equal to 3), thereby identifying that operation records with LSN equal to 4 and 5 are two unapplied operations for cache 104a. Update module 204 accesses the operation record with LSN=4 having a key "Bob". Further, update module 204 checks whether a data item with key "Bob" is already cached in cache 104a. As the data item with the key "Bob" is cached, update module 204 performs the action, in this example "Drop", on the cached data item with the key "Bob". Hence, the data item "Bob" is deleted from cache 104a, thereby applying one operation of the two unapplied operations. FIG. 5 illustrates the example state of cache 104a after applying the first unapplied operation, according to one embodiment of the present invention.

Figure 6:
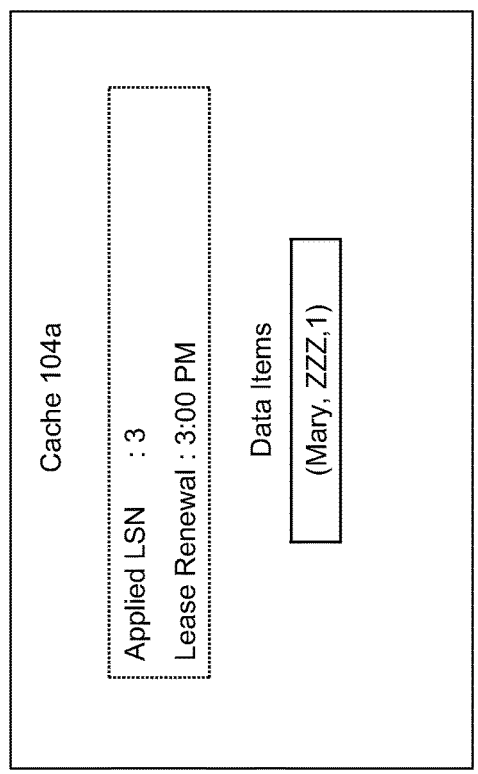
FIG. 6 is an example state of the cache after applying a second unapplied operation, according to one embodiment of the present invention.

Thereafter, update module 204 accesses a second unapplied operation (operation record with LSN=5) and compares the key of this operation record, "Bill" in this example, with keys of the data items stored in cache 104a. Upon finding that the data item with the key "Bill" is present in cache 104a, update module 204 drops the data item "Bill" from cache 104a as indicated by "Drop" in the operation record. Thus, only one data item remains in cache 104a. FIG. 6 illustrates an example state of cache 104a after applying the second unapplied operation to cache 104a, according to one embodiment of the present invention.

Figure 7:
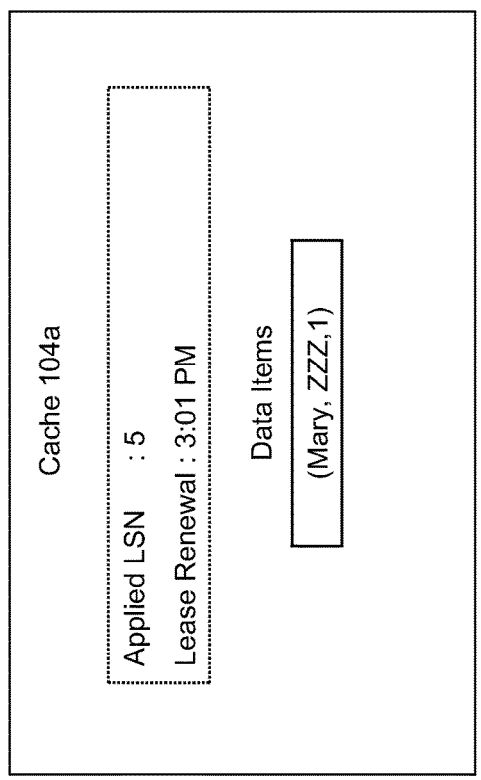
FIG. 7 is an example state of the cache after renewing the lease, according to one embodiment of the present invention.

Thus, update module 204 applies all unapplied operations to cache 104a. Update module 204 changes the applied LSN to 5 and also advances the lease renewal time by the lease interval, one minute in the current example. So, the lease renewal time becomes 3:01 PM. This may indicate that cache 104a is up to date. FIG. 7 illustrates an example state of cache 104a after renewing the lease, according to one embodiment of the present invention.

Figure 8:
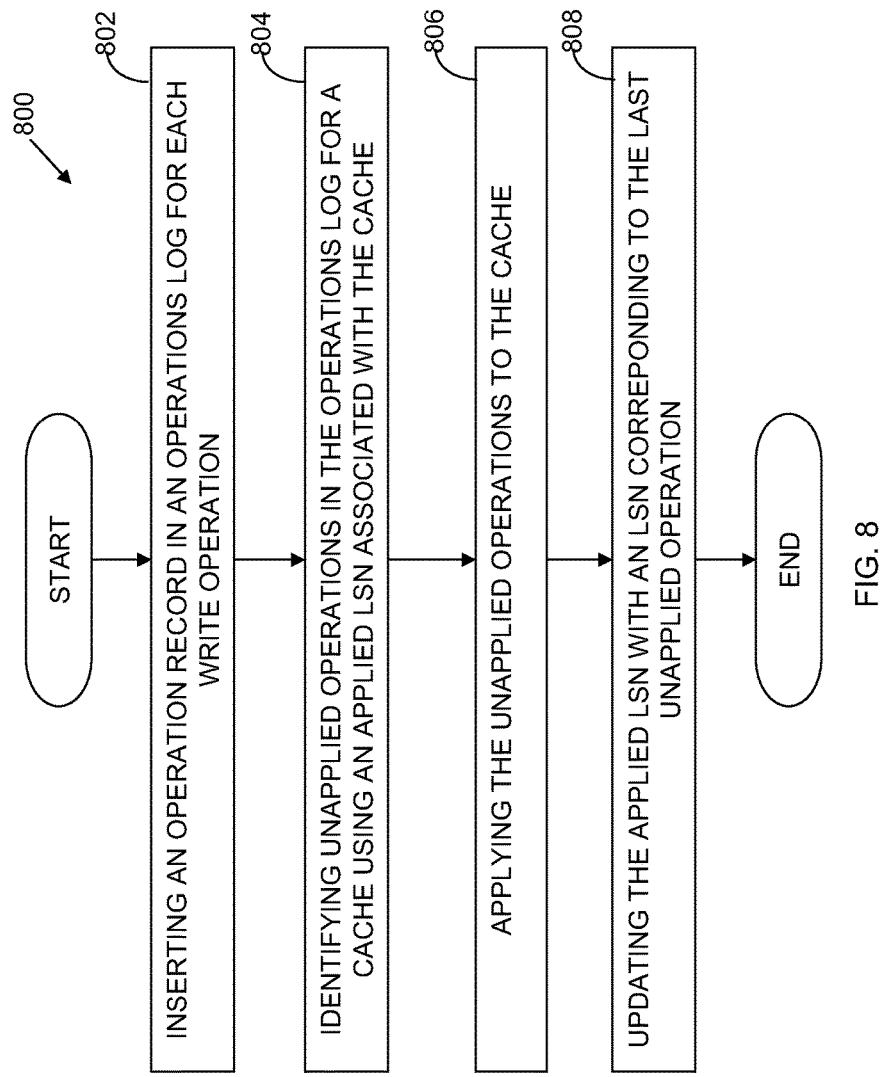
FIG. 8 is a flowchart illustrating an example implementation of a method for managing at least one cache for a database, according to one embodiment of the present invention.

FIG. 8 is a flowchart illustrating an example method 800 for managing at least one cache for a database, in accordance with one embodiment of the present invention. At step 802, an operation record is inserted in an operations log, such as, operations log 108 for each write operation to a database, for example, database 102. Various embodiments for implementing the insertion process are explained in conjunction with FIG. 9. The at least one cache may need to be updated to apply operation in the operations log to maintain consistency between the at least one cache and the database, according to one embodiment of the present invention.

At step 804, unapplied operations for a cache (for example, cache 104a) are identified using an applied LSN for the cache. The applied LSN denotes LSN of the last operation applied by the cache. In one embodiment, to identify the unapplied operations, the applied LSN is compared with the last LSN denoting the most recent operation record in the operations log. If the last LSN is greater than the applied LSN, operations associated with operation records having LSN greater than the applied LSN are identified as the unapplied operations. In one embodiment, update module 204 identifies the unapplied operations for cache 104a using the applied LSN for cache 104a.

Thereafter, at step 806, the unapplied operations are applied to the cache. Thereafter, at step 808, the applied LSN is updated with an LSN corresponding to the last unapplied operation that is applied to the cache during the cache update. Thus, the cache is updated and made up to date till the last LSN. According to one embodiment, steps 804-808 are performed to update cache 104a. In one embodiment, update of cache 104a is trigger at or before the lease renewal time for cache 104a. Accordingly, after updating the applied LSN, the lease on the applied LSN may be renewed and a new lease renewal time set using the lease interval. In one embodiment, lease module 206 renews the lease and updates the lease renewal time. For remaining caches, that is, for caches 104b-104c, steps 804-806 are repeated using respective applied LSN and the lease renewal time.

Figure 9:
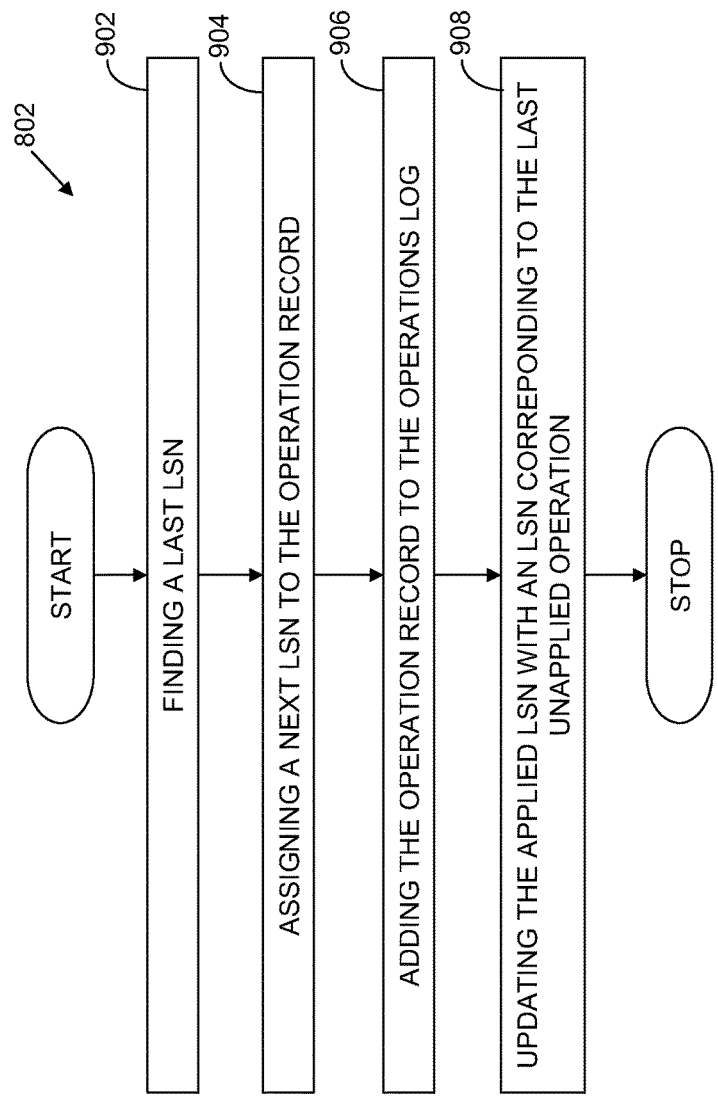
FIG. 9 is a flowchart illustrating an example implementation of a method for inserting an operation record in an operations log, according to one embodiment of the present invention.

FIG. 9 is a flowchart illustrating an example method 802 for inserting a new operation record in the operations log, in accordance with one embodiment of the present invention. At step 902, the last LSN is found, the last LSN denoting LSN of the most recent record in the operations log. The last LSN may be found by scanning the operations log till the end. In one embodiment, an LSN stored in the memoized LSN record may be accessed and the operations log may be scanned starting at an operation record with the memoized LSN. In another embodiment, the operations log may be scanned starting at the applied LSN record of the respective cache. In yet another embodiment, the operations log may be scanned from the beginning, that is, at the first operation record. In one embodiment, insertion module 202 finds the last LSN.

Once the last LSN is obtained, a next LSN is assigned to the new operation record at step 904. In an embodiment where LSNs take successive integer values, (last LSN+1) is assigned to the new operation record. A person skilled in the art will recognize that any other suitable scheme of representing the LSNs may be devised and the next LSN may be assigned accordingly. Thereafter, at step 906, the new operation record is added to the operations log. In an embodiment of the present invention, the new operation record is added using Test-and-Set function, that is, an attempt to add the new operation record at (last LSN+1) is made. If the attempt fails, the step is repeated by adding the new operation record at (last LSN+2), (last LSN+3) and so on, until the new operation record is successfully added. Thereafter, at step 908, the memoized LSN is updated with the LSN at which the new operation record was successfully added to the operations log.

Figure 10:
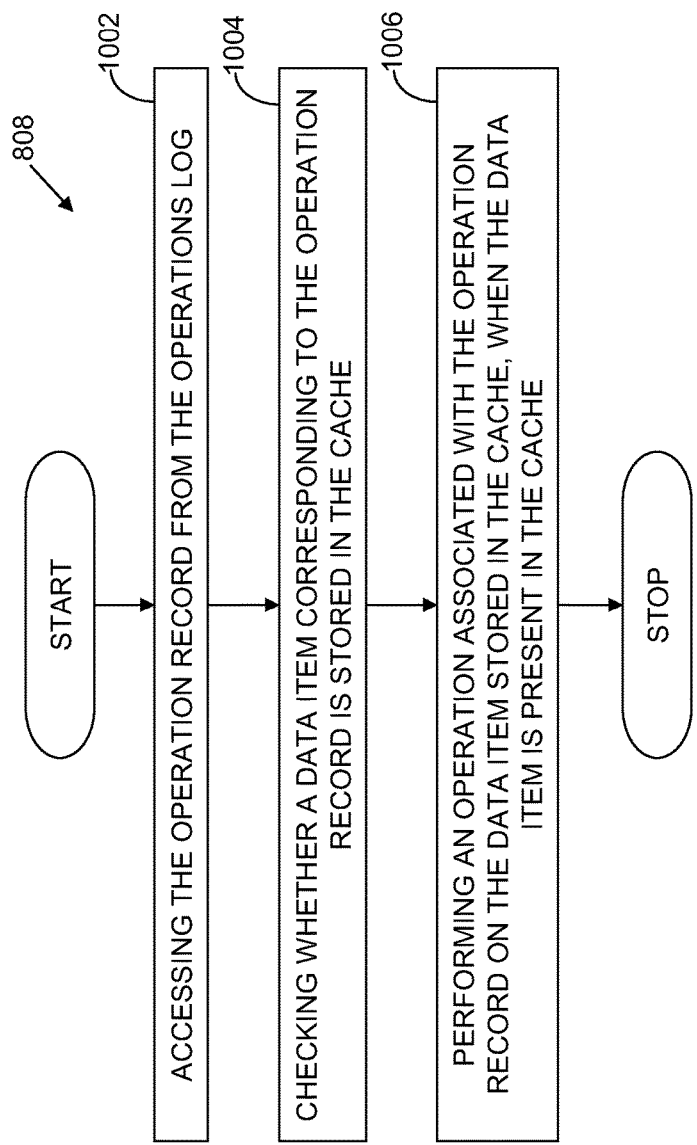
FIG. 10 is a flowchart illustrating an example implementation of a method for applying unapplied operations to a cache, according to one embodiment of the present invention.

FIG. 10 is a flowchart illustrating an example method 808 for applying the unapplied operations to the cache, in accordance with one embodiment of the present invention. At step 1002, an operation record is accessed from the operations log, for example, from operations log 108. Thereafter, at step 1004, it is checked whether a data item associated with the operation record is stored in the cache. This may be done by comparing the key in the operation record with keys for data items stored in the cache. In one embodiment, update module 204 performs the check. When the data item is present in the cache, an action associated with the operation record is performed on the data item stored in the cache at step 1006. The action may be a default action for all operation records or an operation record may include a specific action to be performed on the data item associated with that operation record. When the data item is not present in the cache, the operation record is ignored and steps 1002-1006 are repeated for a next operation record until the end of the operations log is reached.

Figure 11:
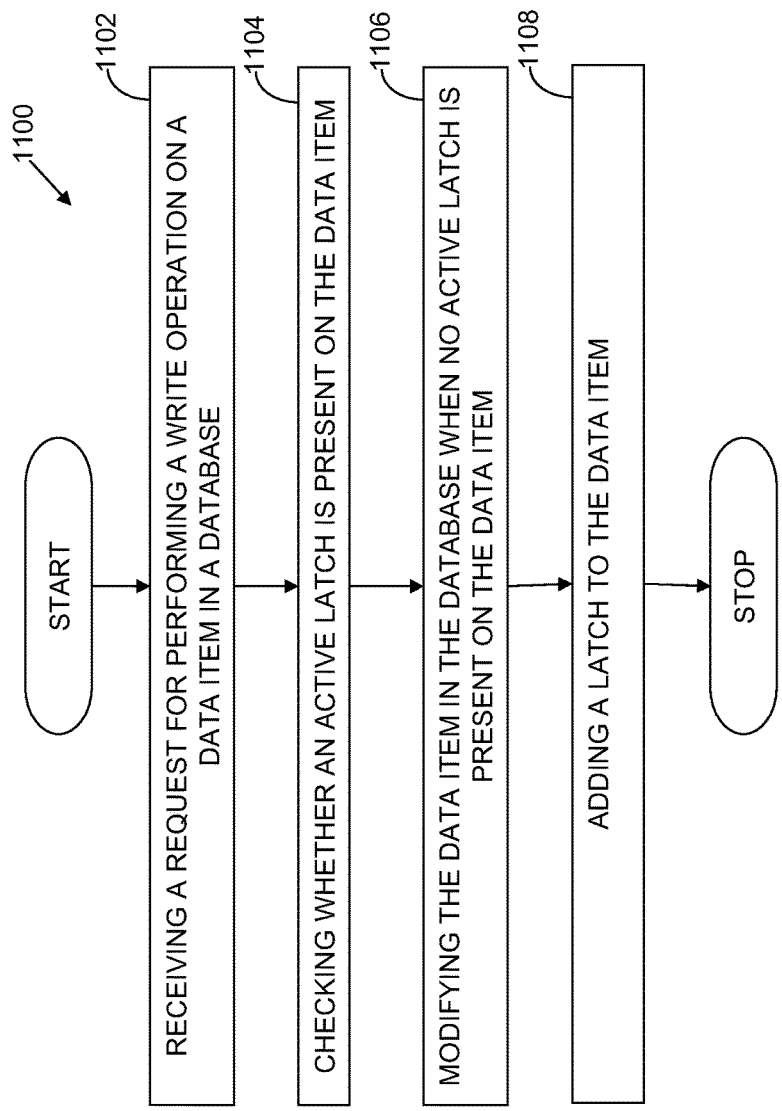
FIG. 11 is a flowchart illustrating an example implementation of a method for maintaining strict consistency for a write operation on a data item in the database, according to one embodiment of the present invention.
Figure 13:
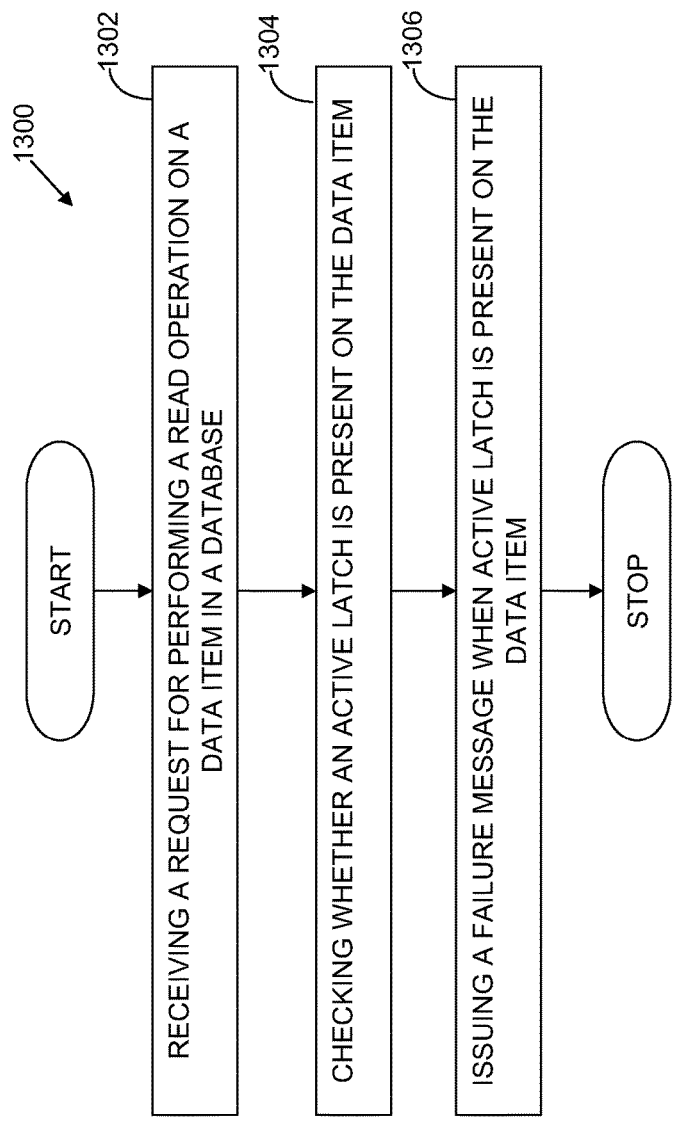
FIG. 13 is a flowchart illustrating an example implementation of a method for maintaining strict consistency for a read operation on a data item in the database, according to one embodiment of the present invention.

As mentioned earlier, in additional embodiments of the present invention, system 100 may also maintain strict consistency between the at least one cache, for example, caches 104a-104c. FIGS. 11 and 13 describe various embodiments of methods for maintaining the strict consistency. FIG. 11 is a flowchart illustrating an example method 1100 for maintaining the strict consistency for a write operation to the database for a data item, according to one embodiment of the present invention. At step 1102, a request is received from an application, such as, application 110a, for performing the write operation on the data item in the database. In one embodiment, cache control module 106 receives the request. At step 1104, a check performed to determine whether an active latch is present on the data item in the database. In one embodiment, cache control module 106 performs the check. In an example implementation when the database supports latch expiration mechanism, presence of the latch may indicate that the latch is active. In another example implementation when a latch creation timestamp is used for the latch, cache control module 106 may also calculate whether system time provided by the database has advanced beyond the latch creation timestamp by a predetermined duration, for example, by (N*lease interval). When the system time has not advanced more than the predetermined duration, cache control module 106 may conclude that the latch is active.

When the latch is active, the write operation may be treated as a failure and a failure message may be sent to application 110a, according to one embodiment. Alternatively, the write operation is delayed till the latch become inactive. When no active latch is present on the data item in the database, the data item is modified according to the write operation at step 1106. Thereafter, at step 1108, a latch is added to the data item. According to one embodiment, the latch expiration time may also be set. In an example implementation, the latch expiration time is set to (N*lease interval). In another embodiment, the latch creation timestamp, for example, "this latch was set at 3:00 PM", may be added to the latch.

Figure 12:
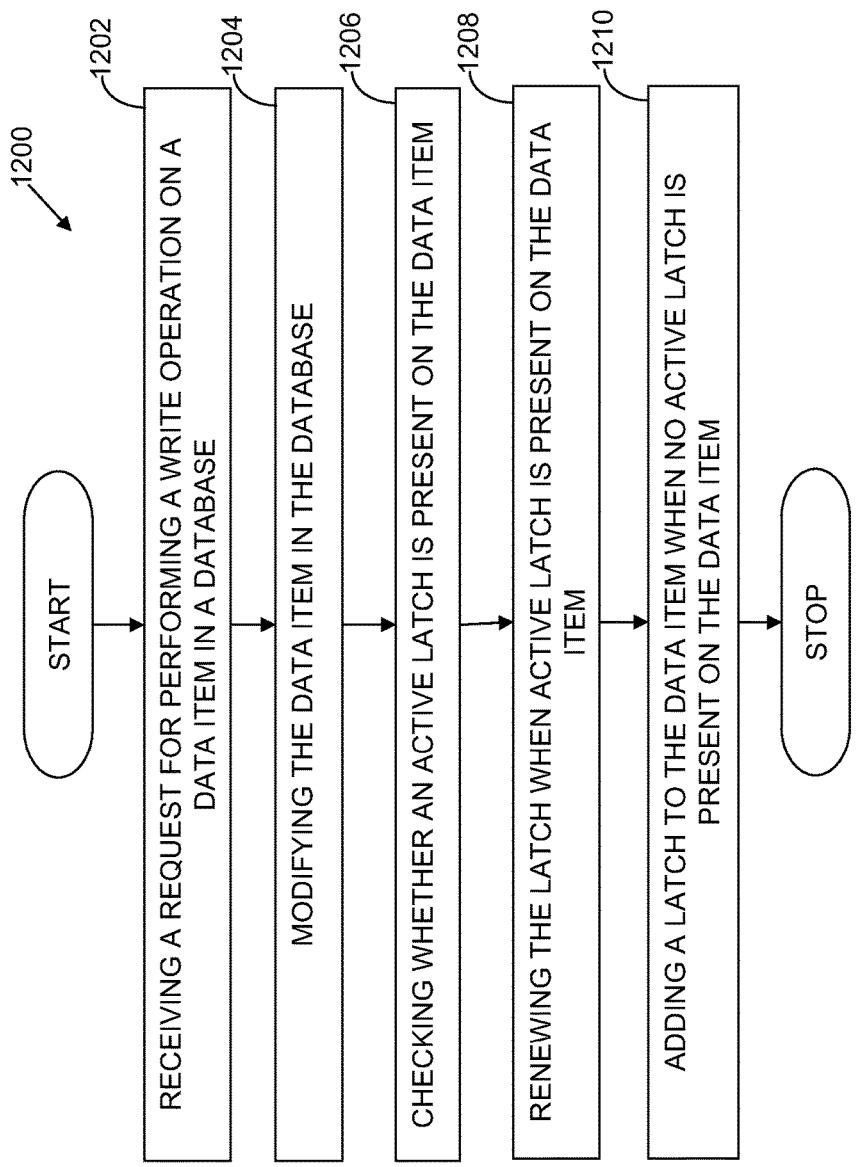
FIG. 12 is a flowchart illustrating another example implementation of a method for maintaining strict consistency for a write operation on a data item in the database, according to one embodiment of the present invention.

FIG. 12 is a flowchart illustrating another example method 1200 for maintaining the strict consistency for a write operation to the database for a data item, according to one embodiment of the present invention. At step 1202, a request is received from an application, such as, application 110*a*, for performing the write operation on the data item in the database. In one embodiment, cache control module 106 receives the request. At step 1204, the data item is modified according to the write operation. In one embodiment, cache control module 106 performs the modification. Thereafter, at step 1206, a check performed to determine whether an active latch is present on the data item in the database. In one embodiment, cache control module 106 performs the check as explained earlier. When the latch is active, the latch is renewed at step 1208. According to one embodiment, when the database supports the latch expiration mechanism, the latch expiration time is reset to (N*lease interval) for renewing the latch. In another embodiment, when the database does not support the latch expiration mechanism, a new latch creation timestamp is added to the renewed latch. When no active latch is present on the data item in the database at step 1306, a latch is added to the data item at step 1210. Further, depending upon implementation, the latch expiration time may be set or the latch creation timestamp may be added.

FIG. 13 is a flowchart illustrating an example method 1300 for maintaining the strict consistency for a read operation to the database for a data item, according to one embodiment of the present invention. At step 1302, a request is received from an application, such as, application 110*a*, for performing the read operation on the data item in the database. In one embodiment, cache control module 106 receives the request. At step 1304, a check performed to determine whether an active latch is present on the data item in the database. In one embodiment, cache control module 106 performs the check. Various embodiments for performing the check are already described in conjunction with FIG. 11. When the latch is active, a failure message may be sent to application 110*a* at step 1306. Optionally, the data item along with the latch and corresponding latch expiration time may be cached on the cache, such as, cache 104*a*, according to an embodiment. In another embodiment, the data item may not be cached. When no active latch is present on the data item in the database, the read operation is treated normally and processed as described earlier in conjunction with FIG. 2.

Figure 14:
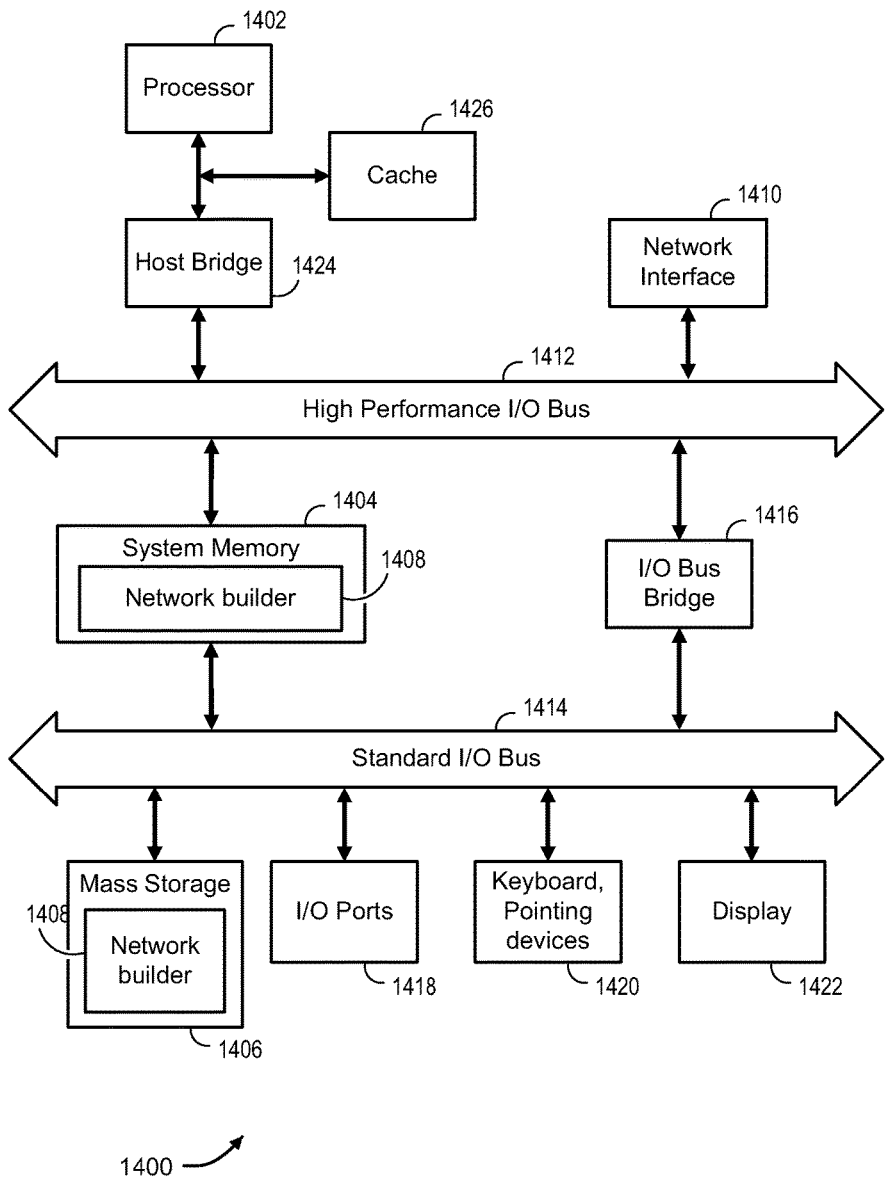
FIG. 14 is a schematic diagram illustrating an example computing system for managing at least one cache for a database, according to one embodiment of the present invention.

Although systems and methods have been described above with reference to specific embodiments, some or all of the elements or operations thereof may be implemented using a computer system having general purpose hardware architecture. FIG. 14 illustrates an example hardware system 1400 to implement system 100 according to one embodiment. Hardware system 1400 includes at least one processor 1402, a system memory 1404, and a mass storage 1406. The system memory 1404 has stored therein one or more application software, programming instructions for implementing the methods disclosed herein, an operating system and drivers directed to the functions described herein. Mass storage 1406 provides permanent storage for the data and programming instructions for the methods disclosed herein, whereas system memory 1404 (e.g., DRAM) provides temporary storage for the data and programming instructions when executed by processor 1402. In an embodiment, the various database disclosed in conjunction with the present invention may reside in mass storage 1406. A network/communication interface 1410 provides communication between hardware system 1400 and any of a wide range of networks, such as an Ethernet (e.g., IEEE 802.3) network, etc. Additionally, hardware system 1400 includes a high performance input/output (I/O) bus 1412 and a standard I/O bus 1414. System memory 1404 and network/communication interface 1410 couple to bus 1412. Mass storage 1406 couple to bus 1414. An I/O Bus Bridge 1416 couples the two buses 1412 and 1414 to each other.

In one embodiment, various methods and processes described herein are implemented as a series of software routines run by hardware system 1400. These software routines comprise a plurality or series of instructions to be executed by a processor in a hardware system, such as processor 1402. Initially, the series of instructions are stored on a storage device, such as mass storage 1406. However, the series of instructions can be stored on any suitable storage medium, such as a diskette, CD-ROM, ROM, EEPROM, DVD, Blu-ray disk, etc. Furthermore, the series of instructions need not be stored locally, and could be received from a remote storage device, such as server on a network, via network/communication interface 1410. The instructions are copied from the storage device, such as mass storage 1406, into system memory 1404 and then accessed and executed by processor 1402.

In one embodiment, hardware system 1400 may also include I/O ports 1418, a keyboard and pointing device 1420, a display 1422 coupled to bus 1412. I/O ports 1418 are one or more serial and/or parallel communication ports that provide communication between additional peripheral devices, which may be coupled to hardware system 1400. A host bridge 1424 couples processor 1402 to high performance I/O bus 1412. Hardware system 1400 may further include video memory (not shown) and a display device coupled to the video memory. Collectively, these elements are intended to represent a broad category of computer hardware systems, including but not limited to general purpose computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

Hardware system 1400 may include a variety of system architectures; and various components of hardware system 1400 may be rearranged. For example, a cache 1426 may be on-chip with processor 1402. Alternatively, cache 1426 and processor 1402 may be packed together as a "processor module," with processor 1402 being referred to as the "processor core." Furthermore, certain embodiments of the present invention may not require nor include all of the above components. For example, the peripheral devices shown coupled to standard I/O bus 1414 may couple to high performance I/O bus 1412. In addition, in some embodiments only a single bus may exist with the components of hardware system 1400 being coupled to the single bus. Furthermore, hardware system 1400 may include additional components, such as additional processors, storage devices, or memories.

An operating system manages and controls the operation of hardware system 1400, including the input and output of data to and from software applications (not shown). The operating system provides an interface between the software applications being executed on the system and the hardware components of the system. According to one embodiment of the present invention, the operating system is the LINUX operating system. However, the present invention may be used with other suitable operating systems, such as the Windows® 95/98/NT/XP/Server operating system, available from Microsoft Corporation of Redmond, Wash., the Apple Macintosh Operating System, available from Apple Computer Int. of Cupertino, Calif., UNIX operating systems, and the like.

While the present invention and its various functional components have been described in particular embodiments, it should be appreciated that the present invention can be implemented in hardware, software, firmware, middleware or a combination thereof and utilized in systems, subsystems, components or sub-components thereof. When implemented in software, the elements of the present invention are the instructions/code segments to perform the necessary tasks. The program or code segments can be stored in a machine readable medium, such as a processor readable medium or a computer program product, or transmitted by a computer data signal embodied in a carrier wave, or a signal modulated by a carrier, over a transmission medium or communication link. The machine-readable medium or processor-readable medium may include any medium that can store or transfer information in a form readable and executable by a machine (e.g., a processor, a computer, etc.).

Further, although various figures in the specification illustrate the foregoing systems as separate systems, the functionality represented by each system may be combined into other systems. Furthermore, the functionality represented by each depicted system may be further separated. Still further, implementations of the present invention may operate in network environments that include multiples of one or more of the individual systems and sites disclosed herein. In addition, other implementations may operate in network environments where one or more of the systems described herein have been omitted.

The present invention has been explained with reference to specific embodiments. For example, while embodiments of the present invention have been described with reference to specific hardware and software components, those skilled in the art will appreciate that different combinations of hardware and/or software components may also be used, and that particular operations described as being implemented in hardware might also be implemented in software or vice versa. Other embodiments will be evident to those of ordinary skill in the art. It is therefore not intended that the present invention be limited, except as indicated by the appended claims.

The invention claimed is:

1. A method comprising:
    inserting an operation record and a particular key into an operations log for one or more individual write operations to one or more items of content of a database at least partially in response to performing the one or more individual write operations to the database, wherein the particular key comprises a name to identify the one or more items of content;
    updating a log sequence indicator value of the database to indicate the operation record at least partially in response to the inserting the operation record into the operations log; and
    updating a first cache and at least a second cache for the database, wherein the first and the at least a second cache are geographically distributed and remote from the database, the updating comprising performing:
        identifying a first applied log sequence indicator value for the first cache to indicate a last applied write operation to the first cache, acquiring, from the database at least partially in response to the identifying the first applied log sequence indicator value, first unapplied write operations indicated by a difference between the log sequence indicator value of the database and the first applied log sequence indicator value for the first cache, applying the first unapplied write operations to update a first copy of at least one of the one or more items of content at least partially in response to determining that the particular key is absent from the first cache, and updating the first applied log sequence indicator value for the first cache to the log sequence indicator value of the database; and
        identifying a second applied log sequence indicator value for the at least a second cache to indicate a last applied write operation to the at least a second cache, acquiring, from the database at least partially in response to the identifying the first applied log sequence indicator value, second unapplied write operations indicated by a difference between the log sequence indicator value of the database and the second applied log sequence indicator value for the second cache, applying the first unapplied write operations to update at least a second copy of the at least one of the one or more items of content at least partially in response to determining that the particular key is absent from the at least a second cache, and updating the second applied log sequence indicator value for the second cache to the log sequence indicator value of the database.

2. The method of claim 1, wherein the inserting the operation record comprises:
    finding a log sequence indicator value, wherein the log sequence indicator value indicates a most recent operation record in the operations log;
    assigning a next log sequence indicator value to the operation record; and
    adding the operation record to the operations log at the next log sequence indicator value.

3. The method of claim 2 further comprising updating the log sequence indicator value to the next log sequence indicator value.

4. The method of claim 1, wherein the applying the first or second unapplied operations comprises, for an operation record having a log sequence indicator value greater than the first or second applied log sequence indicator value:
    accessing the operation record from the operations log;
    checking whether an item corresponding to the operation record is stored in the first cache or the at least a second cache; and
    performing an action associated with the operation record on the item stored in the first cache or the at least a second cache at least partially in response to determining that the item is present in the first cache or the at least a second cache.

5. The method of claim 4, wherein the action comprises drop, repair, or redo.

6. The method of claim 1, further comprising renewing a lease on the log sequence indicator value.

7. The method of claim 1 further comprising, for an access operation to the database for an item, checking to determine whether an active latch is present on the item in the database.

8. The method of claim 7, wherein the access operation comprises a write operation, the method further comprising:
    updating the item in the database;
    renewing the active latch at least partially in response to determining that the active latch is present; and
    adding a latch to the item at least partially in response to determining that the active latch is not present.

9. The method of claim 8 further comprising updating an expiration time for the latch.

10. The method of claim 7, wherein the access operation comprises a write operation, the method further comprising, at least partially in response to the active latch being present, delaying the write operation until the latch becomes inactive.

11. The method of claim 7, wherein the access operation comprises a read operation, the method further comprising issuing a failure message at least partially in response to the read operation if the active latch is present.

12. A system comprising: one or more processors to:
insert an operation record and a particular key into an operations log for a write operation for one or more items of content to a database at least partially in response to performance of the write operation to the database, wherein the particular key comprises a name to identify the one or more items of content;
update a log sequence indicator value of the database to indicate the operation record at least partially in response to the insertion of the operation record into the operations log;
identify a first applied log sequence indicator value for a first cache remote from the database to indicate a last applied write operation to the first cache, acquire, from the database at least partially in response to the identifying the first applied log sequence indicator value first unapplied write operations, the first unapplied write operations to be indicated by a difference between the log sequence indicator value of the database and the first applied log sequence indicator value for the first cache, and apply the first unapplied write operations to update a first copy of at least one of the one or more items of content at least partially in response to a determination that the particular key is absent from the first cache, and update the first applied log sequence indicator value for the first cache to the log sequence indicator value of the database; and
identify a second applied log sequence indicator value for the at least a second cache remote from the database to indicate a last applied write operation to the at least a second cache, acquire, from the database at least partially in response to the identifying the second applied log sequence indicator value second unapplied write operations to be indicated by a difference between the log sequence indicator value of the database and the second applied log sequence indicator value for the second cache, apply the second unapplied write operations at least partially in response to a determination that the particular key is absent from the at least a second cache, and update the second applied log sequence indicator value for the second cache to the log sequence indicator value of the database to update at least a second copy of the at least one of the one or more items of content, wherein the at least a second cache is to be geographically distributed from the first cache.

13. The system of claim 12 further comprising a lease module to renew, for a geographically distributed cache, a lease on the log sequence indicator value.

14. The system of claim 13, wherein the lease module is to trigger an update for a cache on or before expiration of the lease for the geographically distributed cache.

15. The system of claim 12, further comprising a write consistency module to:
check, for a write operation to the database for an item, whether an active latch is present on the item in the database;
update the item in the database;
add a latch to the item at least partially in response to a determination that the active latch is not present; and
renew the latch at least partially in response to a determination that the active latch is present.

16. The system of claim 12, further comprising a read consistency module to:
check, for a read operation to the database for an item, whether an active latch is present on the item in the database; and
issue a failure message at least partially in response to the read operation and at least partially in response to a determination that the active latch is present.

17. The system of claim 12 further comprising a check pointing module to delete, from the operations log, one or more operation records that are older than a predefined duration.

18. A non-transitory computer-readable storage medium encoded with computer-executable instructions executable by one or more processors to:
insert an operation record and a particular key into an operations log for individual write operations for one or more items of content to a database at least partially in response to performance of the individual write operations to the database, wherein the particular key comprises a name to identify the one or more items of content;
update a log sequence indicator value of the database to determine a log sequence indicator to indicate the operation record at least partially in response to the insertion of the operation record into the operations log;
identify a first applied log sequence indicator value for a first cache remote from the database to indicate a last applied write operation to the first cache, acquire, from the database at least partially in response to identification of the first applied log sequence indicator value, first unapplied write operations, the first unapplied write operations to be indicated by a difference between the log sequence indicator value and the first applied log sequence indicator value for the first cache, apply the first unapplied write operations to update a first copy of at least one of the one or more items of content, at least partially in response to a determination that the key is absent from the first cache and update the first applied log sequence indicator value to the log sequence indicator value; and
identify a second applied log sequence indicator value for the at least a second cache remote from the database to indicate a last applied write operation to the at least a second cache, acquire, from the database at least partially in response to identification of the second applied log sequence indicator value second unapplied write operations to be indicated by a difference between the log sequence indicator value of the database and the second applied log sequence indicator value for the second cache, apply the second unapplied write operations and update the second applied log sequence indicator value to the log sequence indicator value to update at least a second copy of the at least one of the one or more items of content at least partially in response to a determination that the key is absent from the at least a second cache, wherein the at least a second cache is to be geographically distributed from the first cache.

19. The computer-readable storage medium of claim 18, wherein the instructions are further executable by the one or more processors to:
find a last log sequence indicator value, wherein the last log sequence indicator value is to comprise the log sequence indicator value of a most recent operation record in the operations log;

assign a next log sequence indicator value to the operation record; and add the operation record to the operations log.

20. The computer-readable storage medium of claim 19, wherein the instructions are further executable by the one or more processors to update the last log sequence indicator value to the next log sequence indicator value.

21. The computer-readable storage medium of claim 18, wherein the instructions are further executable by the one or more processors to:

access an operation record from the operations log to have a log sequence indicator value to be greater than at least one of the first or second applied log sequence indicator value;

check whether an item that corresponds to the operation record is to be stored in the at least two geographically distributed caches; and if the item is present in the at least two geographically distributed caches, perform an action to be associated with the operation record on the item to be stored in the at least one of the first cache or the at least a second cache.

22. The computer-readable storage medium of claim 18, wherein the instructions are further executable by the one or more processors to renew a lease on the log sequence indicator value.

23. The computer-readable storage medium of claim 18, wherein the instructions are further executable by the one or more processors to check, for an access operation to the database for an item, whether an active latch is present on the item in the database.

24. The computer-readable storage medium of claim 23, wherein the access operation is to comprise a write operation, wherein the instructions are further executable by the one or more processors to:

update the item in the database at least partially in response to a determination that the active latch is not present;

renew the active latch, at least partially in response to a determination that the active latch is present; and add a latch to the item, at least partially in response to a determination that the active latch is not present.

25. The computer-readable storage medium of claim 24, wherein the instructions are further executable by the one or more processors to update an expiration time for the latch.

26. The computer-readable storage medium of claim 23, wherein the access operation is to comprise a write operation, wherein the instructions are further executable by the one or more processors to delay, at least partially in response to a determination that the active latch is present, the write operation until the latch to become inactive.

27. The computer-readable storage medium of claim 23, wherein the access operation is to comprise a read operation, wherein the instructions are further executable by the one or more processors to issue a failure message at least partially in response to the read operation if the active latch is present.

* * * * *